US006999667B2

(12) United States Patent
Jang et al.

(10) Patent No.: US 6,999,667 B2
(45) Date of Patent: Feb. 14, 2006

(54) DISPERSION-CONTROLLED OPTICAL FIBER

(75) Inventors: Yun-Geun Jang, Kumi-shi (KR); Mun-Hyun Do, Kyongsangbuk-do (KR); Sung-Wook Choi, Taegukwangyok-shi (KR); Ju-Chang Han, Kumi-shi (KR); Jeong-Sik Cho, Kumi-shi (KR); Jin-Seong Yang, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 10/391,669

(22) Filed: Mar. 19, 2003

(65) Prior Publication Data

US 2003/0190128 A1 Oct. 9, 2003

(30) Foreign Application Priority Data

Apr. 3, 2002 (KR) ........................................ 2002-18162

(51) Int. Cl.
*G02B 6/02* (2006.01)
*G02B 6/16* (2006.01)
*G02B 6/18* (2006.01)

(52) U.S. Cl. ........................ 385/124; 385/123; 385/127

(58) Field of Classification Search ................. 385/123, 385/124, 100, 127
See application file for complete search history.

(56) References Cited

U.S. PATENT DOCUMENTS 5,659,649 A 8/1997 Nouchi et al. .............. 385/124
6,337,942 B1 1/2002 Kato et al. .................. 385/127
6,449,416 B1 * 9/2002 Lee et al. ................... 385/127
RE38,086 E * 4/2003 Onishi et al. ............... 385/123
6,701,052 B2 * 3/2004 Berkey et al. .............. 385/126

FOREIGN PATENT DOCUMENTS

| | | |
|---|---|---|
| CN | 1287621 A | 3/2001 |
| EP | 1154294 A1 | 11/2001 |
| JP | 55012947 | 1/1980 |
| JP | 2001324636 | 11/2001 |
| WO | WO00/52507 | 9/2000 |
| WO | WO 02/27367 | 4/2002 |
| WO | WO 02/27367 A1 * | 4/2002 |

OTHER PUBLICATIONS

"Study on the Design of Non–Zero Dispersion Shifted Fiber for Ultra–Wide Band WDM Transmission;" Wonkyoung Lee et al.; Proc. 27$^{th}$ Eur. Conf. On Opt. Comm.; vol. 3; Sep. 30, 2001; XP010583436; 2 pages.

* cited by examiner

*Primary Examiner*—Akm Enayet Ullah
*Assistant Examiner*—James D. Stein
(74) *Attorney, Agent, or Firm*—Cha & Reiter, L.L.C.

(57) ABSTRACT

Disclosed is an optical fiber comprising a center core which forms a passageway for transmitting optical signals and has a refractive index $N_1$, and a cladding which encloses the center core and has a refractive index $N_0$. The optical fiber further comprises an upper core, which has a distribution of refractive indices increased starting from a refractive index $N_2$ ($>N_0$) at its outer circumference to the refractive index $N_1$ at its internal circumference, and a minutely depressed refractive index region, which is interposed between said upper core and cladding and has a refractive index $N_3$. The refractive index $N_3$ is lower than the refractive index $N_0$.

11 Claims, 2 Drawing Sheets

DISPERSION-CONTROLLED OPTICAL FIBER

CLAIM OF PRIORITY

This application claims priority to an application entitled "Dispersion-controlled optical fiber" filed with the Korean Intellectual Property Office on Apr. 3, 2002 and assigned Serial No. 2002-18162, the contents of which are hereby incorporated by reference.

BACKGROUND OF THE INVENTION

1. Field of the Invention

The present invention relates to an optical fiber and, more particularly, to a broad band dispersion-controlled optical fiber.

2. Description of the Related Art

As one skilled in the art can readily appreciate, an optical fiber consists of a core and a cladding, wherein the refractive index of the core is higher than that of the cladding. Common known methods for manufacturing the base material of an optical fiber includes the Modified-Chemical-Vapor Deposition (MCVD) method, Vapor-phase Axial Deposition (VAD) method, Outside Vapor-phase Deposition (OVD) method, Plasma-Chemical-Vapor Deposition (PCVD) method and the like.

For achieving ultra-high speed and high capacity communication, dispersion-controlled optical fibers (for example, dispersion-shifted fiber (DSF), non-zero DSF (NZDSF), dispersion-compensated fiber (DSF)) have been deployed which are superior to the existing single-mode optical fiber in terms of transmission capability. As such, the demand for the dispersion-controlled fibers has been increasing. If a region with a depressed refractive index is interposed between the core and cladding to form an optical fiber, it is possible to effectively control the dispersion characteristics of the optical fiber. An example of such an optical fiber is disclosed in U.S. Pat. No. 4,715,679 to Venkata A. Bhagavatula, entitled "Low Dispersion, Low-loss Single-mode Optical Waveguide."

However, the dispersion-controlled optical fiber of this type has drawbacks in that its bending loss tends to be high as it has a region with a highly depressed refractive index in its cladding. In addition, a non-linear effect occurs due to its small effective cross-sectional area as it has a small mode-field diameter (MFD) when compared to common single-mode optical fibers. Furthermore, it is inappropriate for broad-band transmission, and the loss and dispersion characteristics are poor in higher and lower wavelength ranges.

A dispersion-controlled optical fiber has a very small core diameter and high refractive index when compared to a single-mode optical fiber. As such, if the dimension of its base material forms a large aperture, a problem will arise as relatively large stresses are applied to the core part at the time of drawing it. Namely, the distribution of wavelengths will be changed. This means that it is difficult for various optical characteristics to have constant values in accordance with drawing temperatures. Also, it is not easy to manufacture a dispersion-controlled optical fiber if it has relatively sensitive characteristics when compared to a common single-mode optical fiber.

In addition, the existing dispersion-controlled optical fibers are adapted to be used in the wavelength range of about 1530~1565 nm by setting the zero dispersion wavelength around 1530 nm, wherein the optical fibers have a dispersion characteristic of not more than 5 ps/nm·km at 1550 nm and their diameters range between 8~9 μm, thus being problematic in that they are inappropriate for communication exceeding the 10 Gbps level.

As explained above, dispersion-controlled optical fibers in the prior art have the following problems:

a) the existing dispersion-controlled optical fibers, such as a dispersion-compensated fiber, dispersion-shifted fiber, non-zero dispersion-shifted fiber, use a small wavelength window as the zero dispersion is positioned adjacent to 1530 nm, thus not suitable for use in high capacity transmission;

b) an optical fiber of low dispersion has the problem of exhibiting a small dispersion characteristic, i.e., a non-linear effect (four-wave mixing (FWM), and a cross-phase modulation (XPM)) is generated at the time of super-high speed transmission;

c) a common single-mode optical fiber has the problem of exhibiting an overly large dispersion (≧17 ps/nm·km) characteristic in the EDF window, thus a non-linear effect (self phase modulation (SPM)) is produced; and, d) if an optical fiber has a high core-refractive index and a small core diameter in order to control the dispersion characteristic, a problem may arise in that it may be greatly influenced by a non-linear effect as it has a small mode-field diameter (effective cross-sectional area at 1550 nm<50 $\mu m^2$). In addition, there is a problem in that the aforementioned non-linear effect is further amplified if the dispersion value is either too large or too small (XPM, SPM and FWM have a trade-off relationship), thereby deteriorating transmission characteristics.

SUMMARY OF THE INVENTION

Accordingly, the present invention has been made to solve the above-mentioned problems occurring in the prior art and provides a dispersion-controlled optical fiber, in which a desired dispersion characteristic and a dispersion slope characteristic can be obtained, and further has a low-loss characteristic.

Another aspect of the present invention is to provide a dispersion-controlled optical fiber, in which a large effective cross-sectional area can be obtained to reduce a non-linear effect with a large mode-field diameter through a large core diameter.

Another aspect of the present invention is to provide a dispersion-controlled optical fiber, which can secure a broad range of usable wavelengths (1400~1625 nm) by positioning a zero-dispersion wavelength range on or below 1400 nm, and which can have a dispersion characteristic in the range of about 5~13 ps/nm·km at 1550 nm, thus reducing the non-linear effect.

Accordingly, there is provided an optical fiber comprising a center core which forms a passageway for transmitting optical signals and has a refractive index $N_1$, and a cladding that encloses the center core and has a refractive index $N_0$, wherein the optical fiber further comprises an upper core that has a distribution of refractive indices, which increase starting from a refractive index $N_2$ ($>N_0$) at its outer circumference to the refractive index $N_1$ at its internal circumference, and a minutely-depressed, refractive-index region, which is interposed between the upper core and the cladding and has a refractive index $N_3$, wherein the refractive index $N_3$ is lower than the refractive index $N_0$.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
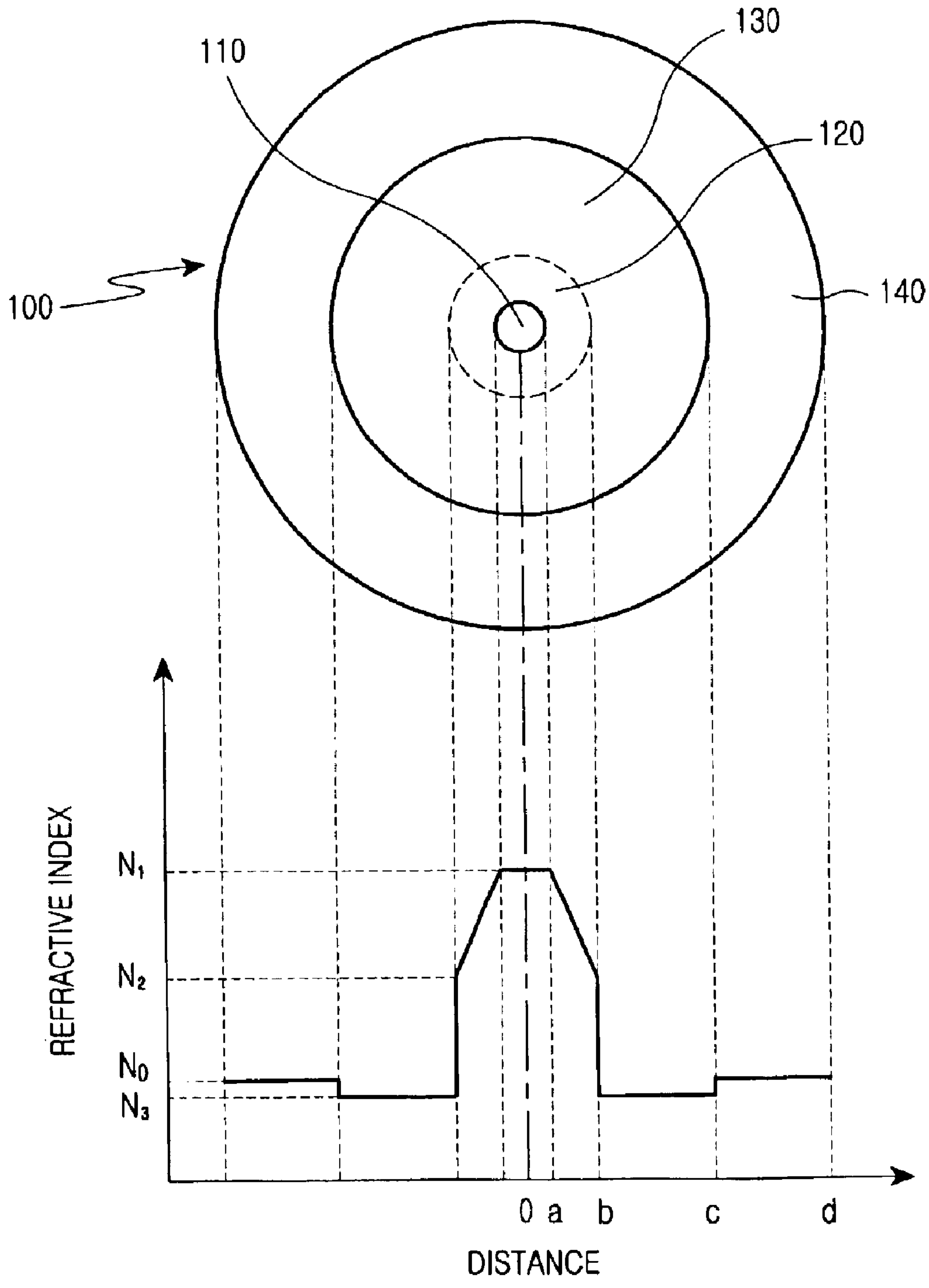
FIG. 1 shows the construction and distribution of refractive indices of a dispersion-controlled optical fiber according to a preferred embodiment of the present invention.

FIG. 1 shows the construction and distribution of the refractive indices of a dispersion-controlled optical fiber in accordance with a preferred embodiment of the present invention. As shown in FIG. 1, the dispersion-controlled optical fiber 100 consists of a center core 110, an upper core 120, a minutely depressed refractive index region 130, and a cladding 140.

The center core 110 consists of silica and has a radius, a. In the embodiment, the center core 110 is doped with a predetermined amount of germanium for tuning its refractive index to $N_1$.

The upper core 120 has an internal radius of a and an external radius of b, and a refractive index of N1 at its internal circumference and a refractive index of N2 at its external circumference. As shown in FIG. 1, the refractive indices of the upper core 120 linearly increases from the external circumstance to the internal circumstance.

The minutely-depressed, refractive-index region 130 is formed from a silica material with an internal radius of b and an external radius of c. Furthermore, the minutely depressed refractive index region 130 is doped with germanium, phosphorus, and fluorine in a predetermined ratio for tuning its refractive index to $N_3$.

The cladding 140 is formed of silica and has an internal radius of a and an external radius of b, and further has a refractive index of $N_0$, which is higher than $N_3$ and lower than $N_2$.

As constructed above, the zero-dispersion characteristic exists in the dispersion-controlled optical fiber 100 at the region of wavelengths below 1400 nm, and the dispersion-controlled optical fiber 100 has a predetermined range of dispersion values (0.1~4 ps/nm·km at 1400 nm, 5~13 ps/nm·km at 1550 nm, and 8~16 ps/nm·km at 1625 nm) and a large MFD or effective cross-sectional area (8.5~10.0 $\mu$m at 1550 nm), thereby reducing the non-linear effect. For this purpose, the dispersion-controlled optical fiber 100 conforms to the relationships of $0.06 \leqq a/c \leqq 0.9$, $0.06 \leqq a/b \leqq 0.8$, $0.02 \leqq a/c \leqq 0.9$, $1.2 \leqq N_1/N_2 \leqq 2.67$ and $-8 \leqq N_1/N_3 \leqq 1.6$. In this case, the refractive index of referenced glass exhibits 1.45709 when measured with a He—Ne laser at 632.8 nm.

Figure 2:
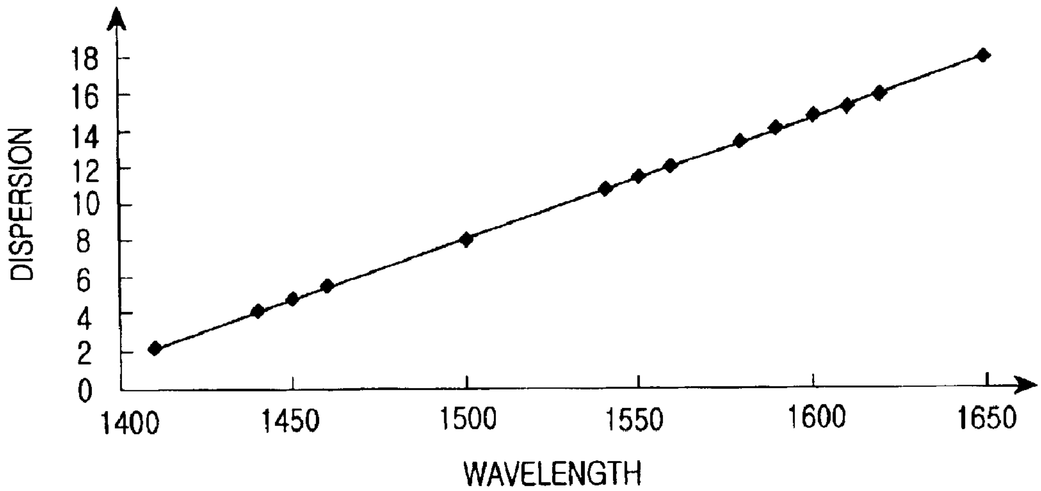
FIG. 2 shows the dispersion characteristic of the dispersion-controlled optical fiber shown in FIG. 1; and, FIG. 3 shows the loss characteristic of the dispersion-controlled optical fiber shown in FIG. 1.
Figure 3:
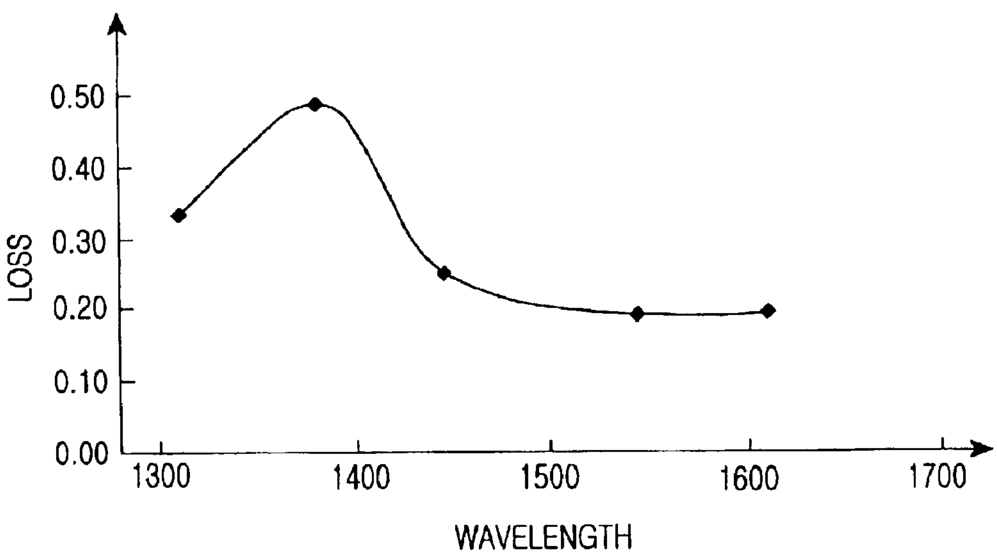

FIG. 2 shows the dispersion characteristic of dispersion-controlled optical fiber 100 shown in FIG. 1, and FIG. 3 shows the loss characteristic of dispersion-controlled optical fiber 100 shown in FIG. 1. FIGS. 2 and 3 show the case where a/b=0.206, a/c=0.0781, $N_1$=0.4781%, $N_2$=0.273%, and $N_3$=−0.0683%, in which the dispersion values at 1400~1625 are 2~16 ps/nm·km and the mode field diameter at 1550 nm is 9.5 $\mu$m. In this case, the refractive index of referenced glass exhibits 1.45709 when measured with a He—Ne laser at 632.8 nm, wherein $N_1$, $N_2$, $N_3$ indicate the percentage of this value, and a=0.5, b=2.43, and c=6.4.

The upper core 120, which has the predetermined refractive index slope, permits a large mode field diameter and can be tuned to have the desired dispersion value and dispersion-slope characteristics, together with the minutely-depressed, refractive-index region 130. As the minutely-depressed, refractive-index region 130 has a refractive index that is minutely different from that of the cladding 140, a minute bending may be induced which is small when compared to the prior art, thereby reducing the bending loss.

In the optical characteristics, if the dispersion is too high, the transmission length of the optical fiber will be restricted and the transmission characteristics will be deteriorated by a self-phase modulation due to phase shifting caused by the non-linear effect. In addition, the dispersion value at a wavelength near zero-dispersion and the small dispersion-value characteristic readily cause phase matching, whereby the transmission characteristic will be deteriorated by four-wave mixing process in the case of multiple-channel transmission, which is typically employed to extend the transmission capacity. Accordingly, it is necessary to have a proper dispersion value to allow a super-high speed and broad-band transmission and to have a large mode-field diameter in order to reduce the non-linear effect.

As such, the dispersion-controlled optical fiber in accordance with the present invention can obtain a dispersion value and dispersion slope suitable for super-high speed and broad-band transmission through the tuning of the minutely-depressed, refractive-index region and upper core.

Furthermore, the dispersion-controlled optical fiber in accordance with the present invention has a loss not exceeding 0.25 dB/km, a cutoff wavelength not exceeding 1400 nm, and a dispersion slope not exceeding 0.08 ps/nm$^2$·km, at the wavelength of 1550 nm, has a dispersion value not less than 0.1 ps/nm·km at the wavelength of 1400 nm and a dispersion value not exceeding 16 ps/nm·km at the wavelength of 1625 nm, and further has a mode-field diameter not less than 8.2 $\mu$m at the wavelength of 1550 nm, thus it has suitable optical characteristics for wavelength-division multiplexing transmission using a wavelength band of 1400~1625 nm.

In summary, as explained above, the dispersion-controlled optical fiber has the following advantages:

a) it has a large effective cross-sectional area, whereby it can reduce the non-linear effect;

b) it can easily provide a dispersion value and a dispersion slope that are suitable for super-high speed and broad band-transmission through the tuning of the minutely depressed refractive index region and upper core; and, c) due to the fine difference in refractive indices between the minutely depressed refractive index region and upper core, the bending loss can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A dispersion-controlled optical fiber comprising:

a center core having a refractive index $N_1$ for forming a passageway for transmitting optical signals;

a cladding having a refractive index $N_0$ for enclosing said center core;

an upper core surrounding said center core and having a refractive index distribution increased starting from a refractive index $N_2$ at its outer circumference to the refractive index $N_1$ at its internal circumference; and, a minutely depressed refractive index region having a reflective index $N_3$ and interposed between said upper core and cladding, wherein the refractive index $N_3$ is lower than the refractive index $N_0$, wherein the internal radius a and external radius b of said upper core, and the internal radius c of said cladding meet with the relationships: $0.06 \leqq a/b \leqq 0.8$ and $0.02 \leqq a/c \leqq 0.9$.

2. The dispersion-controlled optical fiber in accordance with claim 1, wherein the internal circumference of said upper core conforms to the external circumference of said center core.

3. The dispersion-controlled optical fiber in accordance with claim 1, wherein the internal circumference of said upper core is spaced from the center of said center core by a predetermined distance.

4. The dispersion-controlled optical fiber in accordance with claim 1, wherein the refractive indices of said upper core linearly increase from $N_2$ to $N_1$.

5. The dispersion-controlled optical fiber in accordance with claim 1, wherein the internal radius a and external radius b of said upper core, and the internal radius c of said cladding meet with the relationships: $1.2 \leqq N_1/N_2 \leqq 2.67$ and $-8 \leqq N_1/N_3 \leqq 1.6$.

6. The dispersion-controlled optical fiber in accordance with claim 1, the optical fiber has a loss not exceeding 0.25 dB/km, a cutoff wavelength not exceeding 1400 nm, and a dispersion slope not exceeding 0.08 ps/nm$^2$·km at the wavelength of 1550 nm.

7. The dispersion-controlled optical fiber in accordance with claim 1, the optical fiber has a dispersion value not less than 0.1 ps/nm·km at the wavelength of 1400 nm, and a dispersion value not exceeding 16 ps/nm·km at the wave length of 1625 nm.

8. The dispersion-controlled optical fiber in accordance with claim 1, wherein the optical fiber has a mode-field diameter not less than 8.2 μm at the wavelength of 1550 nm.

9. The dispersion-controlled optical fiber in accordance with claim 1, wherein the optical fiber comprises suitable optical characteristics for wavelength-division multiplexing transmission using a wavelength band of 1400~1625 nm.

10. A dispersion-controlled optical fiber comprising:

a loss not exceeding 0.25 dB/km, a cutoff wavelength not exceeding 1400 nm, and a dispersion slope not exceeding 0.08 ps/nm$^2$·km at the wavelength of 1550 nm;

a dispersion value not less than 0.1 ps/nm·km at the wavelength of 1400 nm;

a dispersion value not exceeding 16 ps/nm·km at the wavelength of 1625 nm; and a mode field diameter not less than 8.2 μm at the wavelength of 1550 nm, so that the optical fiber has suitable optical characteristics for wavelength-division multiplexing transmission using a wavelength band of 1400~1625 nm.

11. The dispersion-controlled optical fiber in accordance with claim 10, wherein the dispersion value at the wavelength of 1400 nm is between 0.1 and 4 ps/nm·km, the optical fiber has a dispersion value at the wavelength of 1550 nm which is between 5 and 13 ps/nm·km, and the dispersion value at the wavelength of 1625 nm is between 8 and 16 ps/nm·km.

* * * * *